US012246205B1

(12) United States Patent
Edkins

(10) Patent No.: US 12,246,205 B1
(45) Date of Patent: Mar. 11, 2025

(54) FLAME MITIGATION DEVICE FOR FLAMMABLE FUEL CONTAINERS

(71) Applicant: EDK Holdings Ltd, Rochfort (GB)

(72) Inventor: Ryan Edkins, Rochfort (GB)

(73) Assignee: EDK Holdings LTD., Rochfort (GB)

( * ) Notice: Subject to any disclaimer, the term of this patent is extended or adjusted under 35 U.S.C. 154(b) by 0 days.

(21) Appl. No.: 18/797,381

(22) Filed: Aug. 7, 2024

(51) Int. Cl.
*A62C 4/00* (2006.01)
*A62C 3/06* (2006.01)

(52) U.S. Cl.
CPC . *A62C 4/00* (2013.01); *A62C 3/06* (2013.01)

(58) Field of Classification Search
CPC .................................... A62C 4/00; A62C 3/06
USPC ......................................................... 220/88.2
See application file for complete search history.

(56) References Cited

U.S. PATENT DOCUMENTS 1,672,042 A * 6/1928 Schmidt .................. F16K 24/04 220/88.2
1,902,258 A * 3/1933 Muller ..................... A62C 4/00 220/88.2
2003/0044740 A1* 3/2003 Brooker .................. F23D 14/82 431/252
2011/0056972 A1* 3/2011 Lynas .................. B60K 15/035 220/745
2012/0189966 A1* 7/2012 Brooker ................... A62C 4/02 222/189.01
2021/0047080 A1* 2/2021 Ouderkirk ............. A62C 3/065

FOREIGN PATENT DOCUMENTS

CN 112107820 A * 12/2020 ............... A62C 4/02
CN 112178255 A * 1/2021 ............... A62C 4/00
CN 117307780 A * 12/2023
RU 2381046 C2 * 2/2010 ............... A62C 3/00

* cited by examiner

*Primary Examiner* — J. Gregory Pickett
*Assistant Examiner* — Niki M Eloshway
(74) *Attorney, Agent, or Firm* — Dicke, Billig & Czaja, PLLC

(57) ABSTRACT

A flame mitigation device for flammable liquid containers includes a cylindrical body with vertical fine mesh screens in the air chamber and horizontal fine mesh screens in the fluid chamber. The air chamber and fluid chamber are separated so fluid and air do not mix or interfere with each other whilst fluid is being poured from the bottle, through the flame mitigation device. When attached to a flammable liquid container, the device provides improved fluid flow and prevents flame propagation, ensuring safe storage and handling of flammable liquids.

29 Claims, 6 Drawing Sheets

FLAME MITIGATION DEVICE FOR FLAMMABLE FUEL CONTAINERS

TECHNICAL FIELD

The technical field of the disclosed embodiments relate to safety devices for containers of flammable liquids. More particularly, the disclosed embodiments relate to a flame mitigation device designed to prevent the ingress of flames into flammable liquid containers while improving fluid flow and air intake.

BACKGROUND

Flame arrestors and other flame mitigation devices are commonly used in containers for flammable liquids to prevent flames from entering the container and igniting the contents. Flame mitigation devices are designed to prevent flames from entering a container of flammable fuel by quenching the flame. This is typically achieved by using barriers that absorb and dissipate the heat of the flame, lowering the temperature below the ignition point.

Many traditional devices utilize a fine mesh or perforated metal as a barrier to quench flames. However, these devices often have a single chamber for both air intake and fluid output, which can significantly reduce the fluid flow rate As the air must pass into the same opening that fluid travels out from, especially when a fine mesh is used.

This configuration can also cause “glugging” where large air bubbles form during the pouring process, leading to splashing and irregular flow. This can be hazardous, particularly with flammable liquids, increasing the risk of spillage and potential ignition, as well as reducing overall flow rate.

SUMMARY

Disclosed are various embodiments of a flame mitigation device that is configured to be connected to a container storing flammable liquid, such as ethanol or bioethanol, for various heat and/or fire-producing appliances such as outdoor fireplaces. This flame mitigation device enhances the safety and efficiency of dispensing flammable liquids through an integrated system of components that improve the flow of the flammable liquid out of the container and air into the container, as well as providing flame mitigation and improved safety.

The device is divided into separate fluid and air chambers, providing independent paths for air and liquid fuel as they flow through the device. This separation prevents interference between the two fluids (flammable liquid and air), improving flow rates and reducing safety risks.

The fluid chamber includes one or more fine mesh screens, e.g., stainless steel wire mesh, that are spaced apart by spacers and their apertures having a size selected to improve fluid flow. The air chamber includes one or more fine mesh screens with smaller apertures than those in the fluid chamber to increase a pressure differential, improving air flow and generally preventing fluid from the container from entering the air chamber. This may be based on the minimum safe experimental gap (MESG)” which is the smallest size aperture that a flame can pass through for a particular gas. For example propane has a higher MESG than ethylene, so a finer grade of mesh that has a smaller aperture can be selected where ethylene gas is produced by the liquid. The air chamber may also include an fluid lock to further prevent any flammable liquid that does enter the air chamber from exiting the device through air inlets on a top plate of the device. As fluid pools in cup-like portion in the chamber, it stops further fluid from exiting and acts as a further flame barrier.

Flames and explosions are typically created from a mixture of combustible gases, not from fluids, so having a separate fluid chamber allows for a finer mesh to be selected, increasing safety by further protecting flame from passing through the fine mesh.

The back of the device may include a back plate with a fluid inlet for fluid to enter from the container and an air outlet with a pipe for air from the air chamber to enter the container and replace the lost volume of exiting fluid. The outlet pipe may have a diameter selected to produce small air bubbles to avoid glugging. A silicone tube may be fit over the outlet pipe and have a length that reaches near the bottom of the container so that the air can avoid the fluid completely, further reducing glugging and increasing fluid flow.

In an embodiment, the air outlet may be in a side wall of the device rather than back, so that the air can pass through the handle of a bottle, to the back of the bottle.

DETAILED DESCRIPTION

Figure 1:
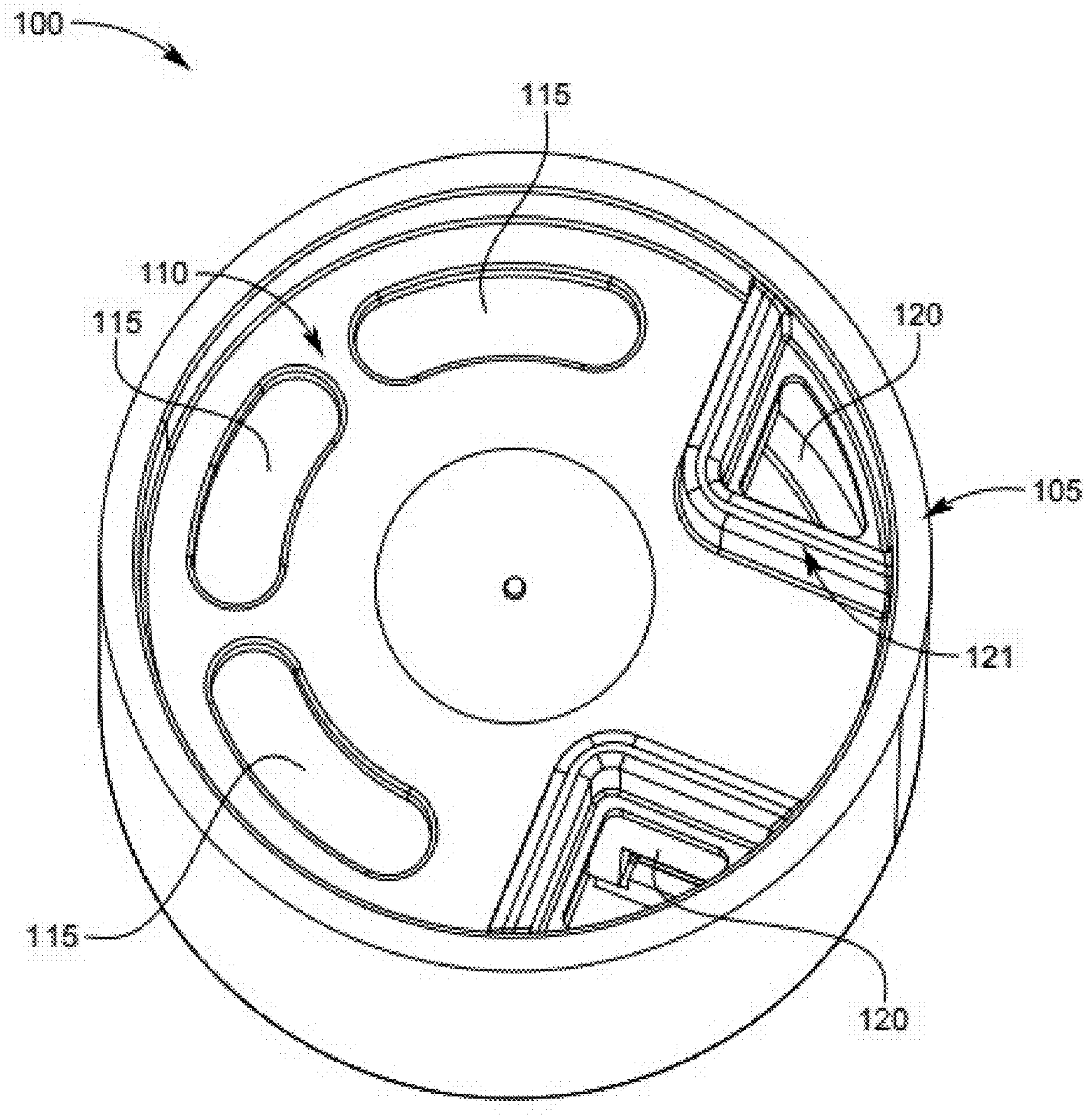
FIG. 1 is a plan view of a top of a flame mitigation device according to an embodiment.

In an embodiment, a flame mitigation device is configured to be connected to a container storing flammable liquid, such as ethanol or bioethanol, for various heat and/or fire-producing appliances like fireplaces. This flame mitigation device enhances the safety and efficiency of dispensing flammable liquids through an integrated system of components that improve the flow of the flammable liquid out of the container and air into the container, as well as providing flame mitigation and improved safety.

The device is divided into separate liquid and air chambers, providing independent paths for air and liquid fuel as they flow through the device. This separation prevents interference between the two fluids, improving flow rates and reducing safety risks.

Flame arrestors and other flame mitigation devices typically use fine mesh screens or other barriers consisting of small holes to absorb and dissipate the heat of the flame, lowering the temperature below the ignition point. However, these screens can decrease the fluid flow rate and cause glugging. To address this, the flame mitigation device described here and in the drawings has separate chambers for air and liquid fuel, which eliminates interference of air and fluid through the device interference and increases flow rates.

Figure 2:
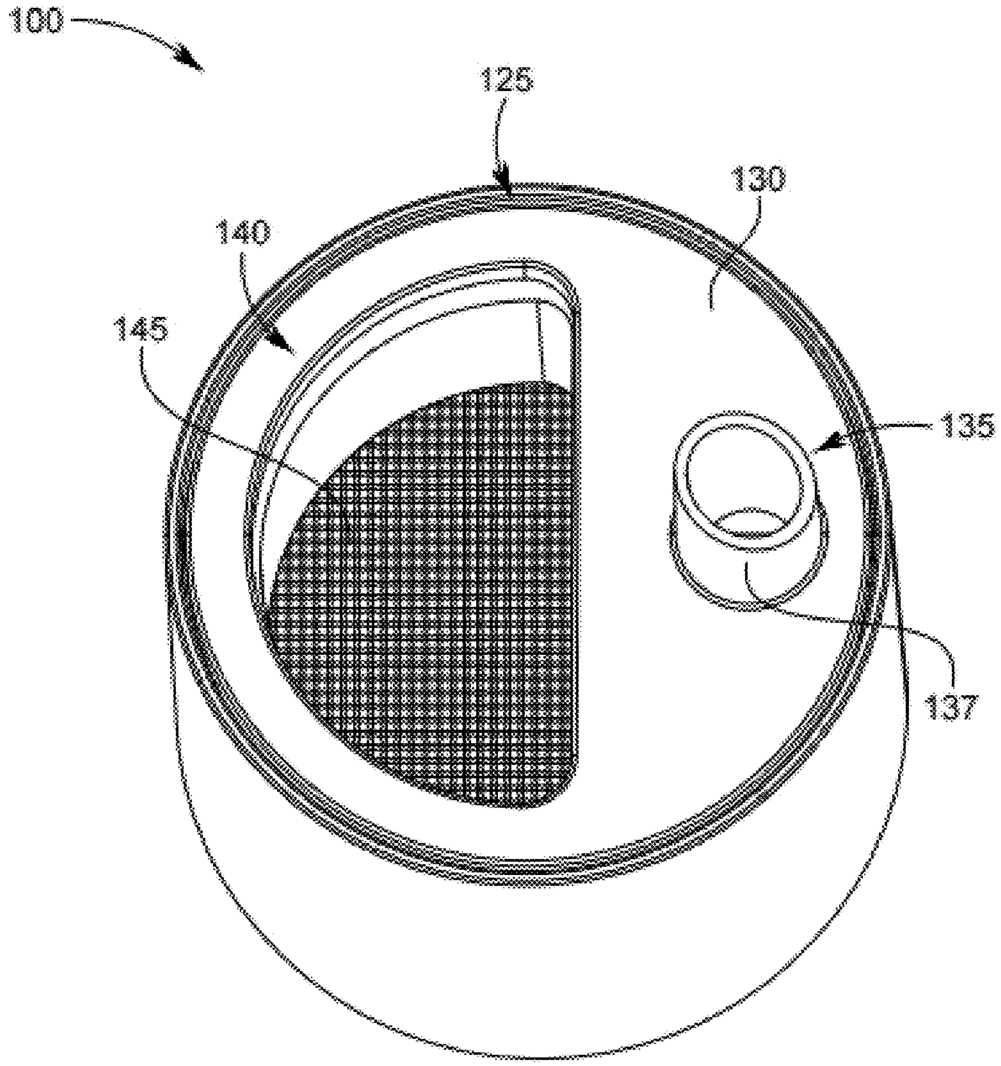
FIG. 2 is a plan view of a bottom of the flame mitigation device of FIG. 1.
Figure 3:
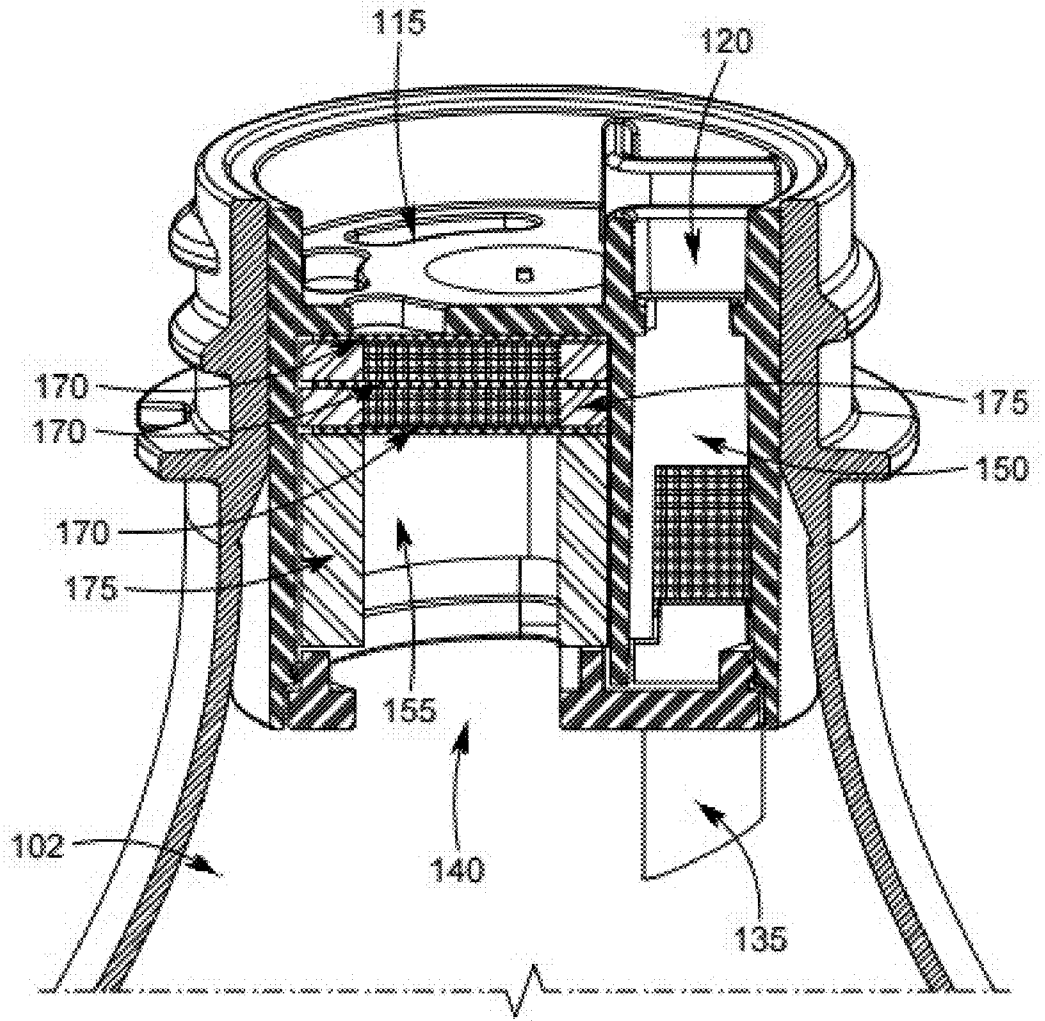
FIG. 3 is a sectional view of the flame mitigation device showing both the air chamber and fluid chamber structures according to an embodiment.

FIG. 1 shows the flame mitigation device 100 to be inserted into the neck of a flammable fuel container 102, e.g., a metal bottle or tank (FIG. 3). The device 100 includes a cylindrical body 105 with a top plate 110 featuring liquid fuel outlets 115 and air inlets (inlet holes) 120. The container 102 may be designed for hand pouring, for example, including a handle. Alternatively, the container may have a larger volume for connection to a delivery system, for example a container including a user operated valve and connected to a flammable liquid heating appliance via a hose or tube. As shown in FIG. 1, the air inlet hole is may have an extruded portion 121 above the fluid outlet level to allow for fluid to flow around the air inlets when pouring so fluid from the fluid outlets does not travel into the air inlets whilst pouring FIG. 2 illustrates the bottom portion 125 of the device 100, including a base plate 130, an air outlet 135 including an air outlet pipe 137, and a fluid inlet 140 for liquid fuel intake from the container. When the user tilts the bottle, liquid fuel pours out from the container into the device 100, and air enters through the air inlets, bubbling to the top of the container to replace the liquid fuel flowing out.

For clarity, the terms "top" and "bottom" are used to reference portions of the device that may also be described as "front" and "back" or "up" and "down," regardless of the device's physical orientation.

Also, while air and liquid fuel are both technically classified as fluids, the terms "liquid fuel" and "fluid" are used interchangeably throughout this application, the term excluding air and other gases.

FIG. 3 is a sectional view of the device 100, showing the air chamber 150 and fluid chamber 155. The air chamber 150 occupies about one-third of the device's total volume and allows air to enter the container smoothly. The fluid chamber 155 occupies about two-thirds of the total volume and facilitates the unobstructed pouring of the liquid fuel from the container.

By segregating the air inlet 120 and fluid outlet 115 into distinct chambers, a lower fluid level in the fluid chamber 155 relative to the air level in the air chamber 150 can be achieved. This creates the necessary pressure differential for a high flow rate and prevents back-flow of liquid fuel into the air chamber. Consequently, safety is enhanced as the air flows through mesh screens with smaller apertures specifically designed for gases. This may be based on the minimum safe experimental gap (MESG)" which is the smallest size aperture that a flame can pass through for a particular gas. For example propane has a higher MESG than ethylene, so a finer grade of mesh that has a smaller aperture can be selected where ethylene gas is produced by the liquid. Additionally, flow rate is improved because the incoming air does not compete with the outgoing fluid.

Figure 4:
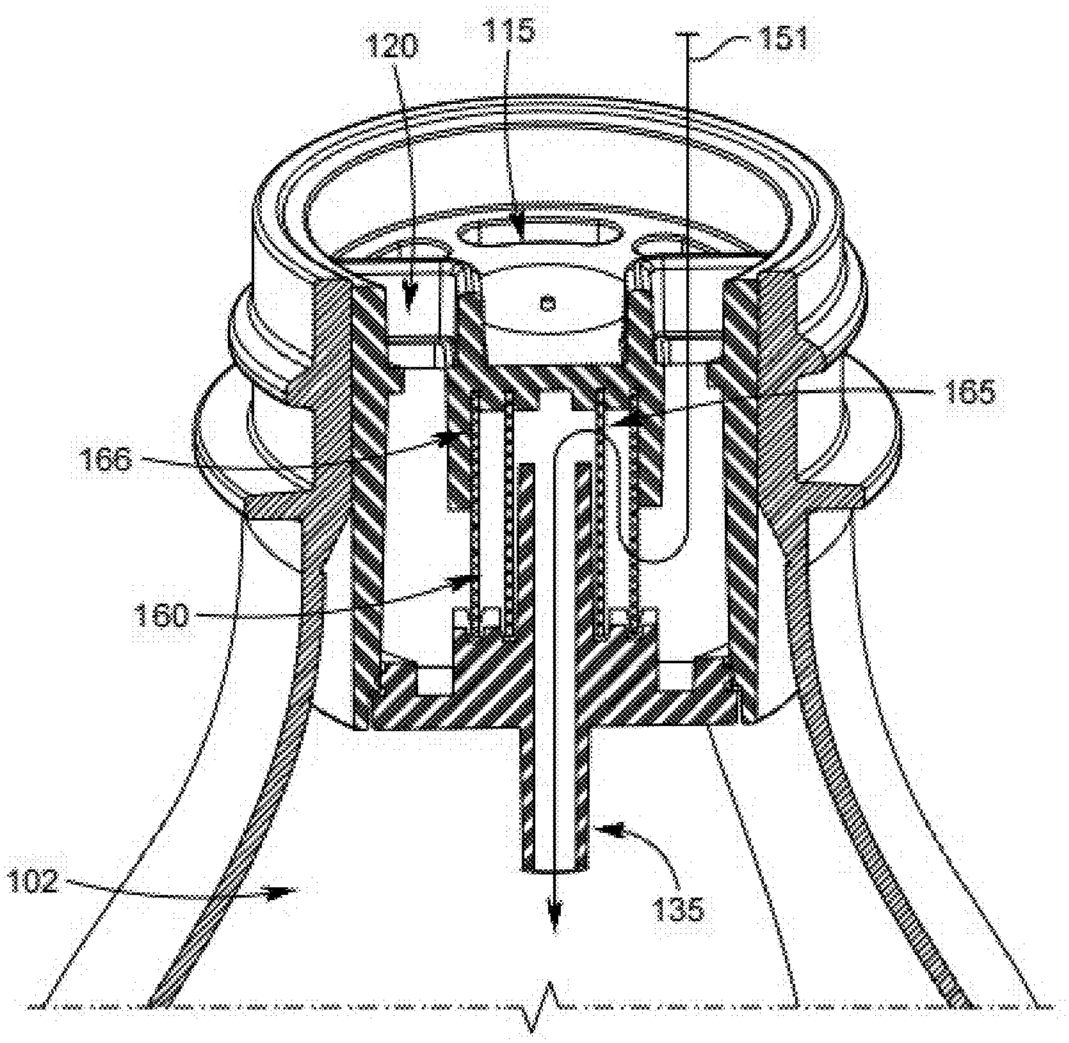
FIG. 4 is a section view of the flame mitigation device showing the structure of the air chamber according to an embodiment.

FIG. 4 shows another view of the air chamber 150. Air 151 flows into the air chamber through both air inlets 120 (FIG. 4 only shows one side for illustrative purposes) and passes through multiple fine mesh screens 160 into the container 102 via the air outlet 135. A fluid lock 165 may be provided to prevent fluid from exiting through the air chamber. As fluid pools in cup-like portion 166 in the chamber, it stops further fluid from exiting and acts as a further flame barrier.

Returning to FIG. 3, the fluid chamber includes one or more fine wire mesh screens 170, separated by spacers 175, which can be adjusted for different heights to accommodate more mesh screen(s). The depth of the spacers can be adjusted so the mesh screens can be placed closer or wider apart depending on required flow. This configuration helps regulate the fluid flow rate and maintains the fluid level below the air level in their respective chambers, creating a pressure differential that improves fluid flow.

In an embodiment, the device may be inserted into the neck of a hand-held flammable fluid container and the user can pour the fluid into the appliance, for example, an outdoor fire place or fire pit.

In another embodiment, an assembly 180, including the container and attached flame mitigation device (FIG. 5), may be connected to a liquid fuel heating appliance (e.g., a fireplace) via a connector that links the assembly to the appliance. The connector may include a valve to control fluid flow and a hose or tube connecting the assembly to the fuel input of the appliance. The assembly is then tilted upside-down into a fuel dispensing position.

When the container is tilted in the hand-held version or the valve on the connector is opened in the static/upside-down version, liquid fuel is released into the connector tube to the appliance. To maintain pressure in the container as fluid exits, air is pulled into the air inlets due to the partial vacuum created by the volume of fluid in the container. This air travels through the air chamber and into the container to replace the dispensed liquid fuel.

The fluid chamber includes multiple horizontal fine mesh screens 170 to regulate the fluid flow rate and maintain a pressure differential. The number of mesh screens and their aperture size can be adjusted using different size spacers and mesh screens. Larger mesh apertures may be used in the fluid chamber, while smaller ones are used in the air chamber to enhance the pressure differential and improve fluid flow.

In the air chamber, as fluid exits the container, ambient air is pulled into the air inlets due to the partial vacuum in the container. The fine mesh screens 160 in the air chamber are oriented vertically, increasing the surface area of mesh the air passes through, improving fluid flow and enhancing the flame quenching effect of the mesh. In an alternative embodiment, the fine mesh screens 160 may be oriented horizontally.

The device also features an anti-glug mechanism. Known devices generally have a single inlet/outlet port for both fluid and air, resulting in glugging as large bubbles enter the container to alleviate the pressure difference between the air inside the bottle and outside. This impedes a steady flow of fluid out of the container. The air outlet pipe 137 has a diameter selected to produce small bubbles to avoid glugging. In one embodiment, a silicone tube 167 fitted over the air outlet pipe 137 directs air to the back of the container, avoiding interference with the fluid and further increasing the fluid flow rate, as shown in FIG. 5.

As air travels through the device through the two air inlets 120, it flows back onto itself through the fluid lock chamber 165, ensuring that no fluid can pass through the air chamber without significant force applied (FIG. 4).

Figure 5:
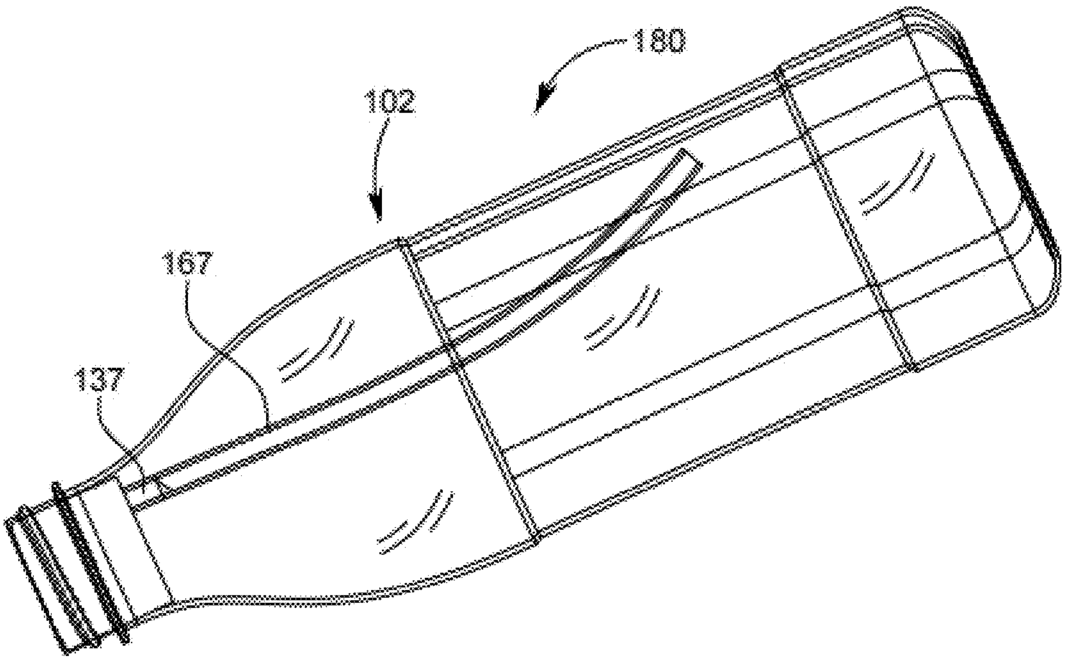
FIG. 5 is a perspective view of a silicone tube fit over an air outlet tube according to an embodiment.

In an alternative embodiment, a hand-held container such as that shown in FIG. 5 also includes a hollow handle connected between near the neck of the container and a mid- or rear portion of the container. As the handle is the side opposite the direction the user would typically tip the container, any fluid in the hollow handle would exit the handle and contain only air. In this embodiment, the air outlet pipe 137 may be inserted into the hollow handle instead of the body of the container, completely avoiding any fluid and assisting in the anti-glugging feature.

Figure 6:
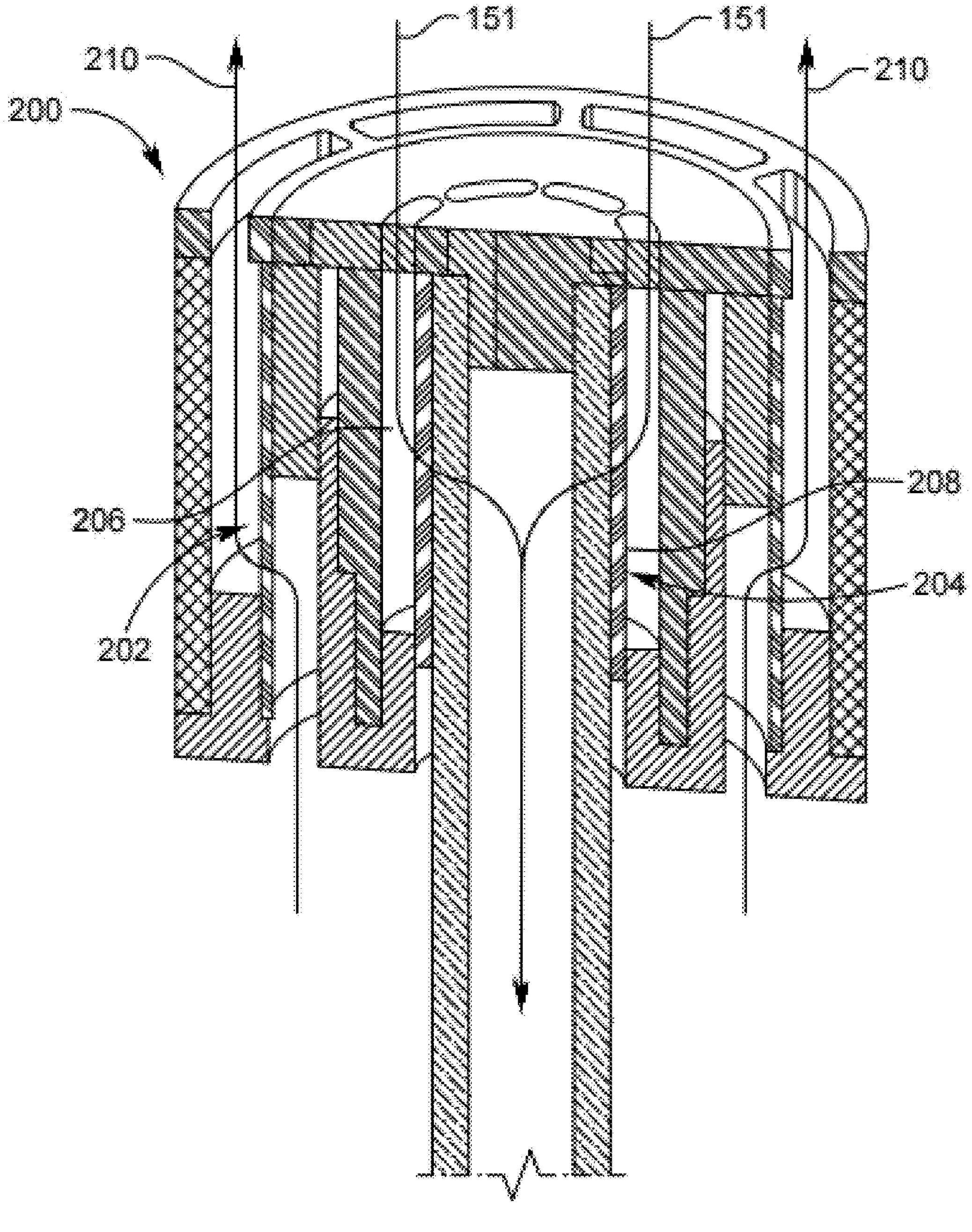
FIG. 6 is a section view of a flame mitigation device according to an alternative embodiment.

In another alternative embodiment shown in FIG. 6, a flame mitigation device 200 which operates in the same general manner as the embodiments described above, a cylindrical fluid chamber 202 surrounds an inner, air chamber 204. The fluid chamber includes one vertically oriented cylindrical fine mesh screen 206 and the air chamber includes one vertically oriented cylindrical fine mesh screen 208. Air 151 flows in through the air inlets and fluid 210 flows out of the fluid outlets at the top of the device.

REFERENCE NUMBER TABLE

100 Flame mitigation device
102 Container
105 Cylindrical body
110 Top plate
115 Fluid outlet
120 Air inlet
121 Air inlet extruded portion
125 Bottom portion
130 Base plate
135 Air outlet
137 Air outlet pipe
140 Fluid inlet
150 Air chamber
151 Air flow
155 Fluid chamber
160 Mesh screen (air)
165 Fluid lock
166 Cup-like portion
167 Silicone tube
170 Mesh screen (fluid)
175 Spacer
180 Assembly
200 Flame mitigation device (alt.)
202 Fluid chamber
204 Air chamber
206 Mesh screen (fluid)
208 Mesh screen (air)
210 Fluid flow The foregoing method descriptions and figures are illustrative examples. The order of operations in the aspects described may be performed in any order. Words such as "thereafter," "then," and "next" guide the reader through the description but do not limit the order of operations. Any reference to claim elements in the singular is not to be construed as limiting the element to the singular. Relative terms such as "top," "bottom," "upper," "lower," "above," "below," and the like describe the relative positions of elements or features and are not limited to the orientations depicted in the drawings.

The specific dimensions and other details set forth regarding specific embodiments are for illustrative purposes only and do not limit the scope of the claims. The description of the disclosed aspects enables any person skilled in the art to make, implement, or use the claims. Various modifications to these aspects will be readily apparent to those skilled in the art, and the generic principles defined herein may be applied to other aspects without departing from the scope of the claims. The present disclosure is not intended to be limited to the specific embodiments described but is to be accorded the widest scope consistent with the claims.

The invention claimed is:

1. A flame mitigation device for use with a container storing flammable liquid, comprising:
- a cylindrical body having a top plate and a bottom plate;
- a fluid chamber within the cylindrical body, the fluid chamber including one or more fine mesh screens configured to regulate flow of the flammable liquid;
- an air chamber within the cylindrical body, the air chamber including one or more fine mesh screens configured to allow air to enter the container while preventing flame propagation;
- a fluid outlet located at the top plate of the cylindrical body, configured to dispense the flammable liquid from the fluid chamber;
- one or more air inlets located at the top plate of the cylindrical body, configured to allow air to enter the air chamber;
- an air outlet located at the bottom plate of the cylindrical body, configured to release air from the air chamber into the container; and
- a fluid inlet located at the bottom plate of the cylindrical body, configured to allow the flammable liquid to enter the fluid chamber,
- wherein the air chamber and the fluid chamber are separated,
- wherein the one or more fine mesh screens in the fluid chamber have a horizontal orientation and the one or more fine mesh screens in the air chamber have a vertical orientation.

2. The flame mitigation device of claim 1, wherein the one or more fine mesh screens in the fluid chamber are separated by exchangeable spacers having a height.

3. The flame mitigation device of claim 1, wherein the one or more fine mesh screens in the fluid chamber include apertures sized to regulate the flow of the flammable liquid.

4. The flame mitigation device of claim 1, wherein the one or more fine mesh screens in the fluid chamber have apertures, wherein the one or more fine mesh screens in the air chamber have apertures smaller than the apertures in the one or more fine mesh screens in the fluid chamber.

5. The flame mitigation device of claim 1, wherein the air outlet is connected to an air outlet pipe with a diameter selected to produce small bubbles to avoid glugging.

6. The flame mitigation device of claim 5, further comprising a tube fitted on the air outlet pipe, the tube having a length sufficient to reach proximate to a bottom of the container.

7. The flame mitigation device of claim 1, wherein the one or more air inlets are extruded above a level of the fluid outlet.

8. A flame mitigation device for use with a container storing flammable liquid, comprising:
- a cylindrical body having a top plate and a bottom plate;
- a fluid chamber within the cylindrical body, the fluid chamber including one or more fine mesh screens configured to regulate flow of the flammable liquid;
- an air chamber within the cylindrical body, the air chamber including one or more fine mesh screens configured to allow air to enter the container while preventing flame propagation;
- a fluid outlet located at the top plate of the cylindrical body, configured to dispense the flammable liquid from the fluid chamber;
- one or more air inlets located at the top plate of the cylindrical body, configured to allow air to enter the air chamber;
- an air outlet located at the bottom plate of the cylindrical body, configured to release air from the air chamber into the container; and
- a fluid inlet located at the bottom plate of the cylindrical body, configured to allow the flammable liquid to enter the fluid chamber,
- wherein the air chamber and the fluid chamber are separated,
- wherein the one or more fine mesh screens in the fluid chamber are separated by exchangeable spacers having a height.

9. The flame mitigation device of claim 8, wherein the one or more fine mesh screens in the fluid chamber have a horizontal orientation and the one or more fine mesh screens in the air chamber have a vertical orientation.

10. The flame mitigation device of claim 8, wherein the one or more fine mesh screens in the fluid chamber include apertures sized to regulate the flow of the flammable liquid.

11. The flame mitigation device of claim 8, wherein the one or more fine mesh screens in the fluid chamber have apertures, wherein the one or more fine mesh screens in the air chamber have apertures smaller than the apertures in the one or more fine mesh screens in the fluid chamber.

12. The flame mitigation device of claim 8, wherein the air outlet is connected to an air outlet pipe with a diameter selected to produce small bubbles to avoid glugging.

13. The flame mitigation device of claim 12, further comprising a tube fitted on the air outlet pipe, the tube having a length sufficient to reach proximate to a bottom of the container.

14. The flame mitigation device of claim 8, wherein the one or more air inlets are extruded above a level of the fluid outlet.

15. A flame mitigation device for use with a container storing flammable liquid, comprising:

- a cylindrical body having a top plate and a bottom plate;
- a fluid chamber within the cylindrical body, the fluid chamber including one or more fine mesh screens configured to regulate flow of the flammable liquid;
- an air chamber within the cylindrical body, the air chamber including one or more fine mesh screens configured to allow air to enter the container while preventing flame propagation;
- a fluid outlet located at the top plate of the cylindrical body, configured to dispense the flammable liquid from the fluid chamber;
- one or more air inlets located at the top plate of the cylindrical body, configured to allow air to enter the air chamber;
- an air outlet located at the bottom plate of the cylindrical body, configured to release air from the air chamber into the container; and
- a fluid inlet located at the bottom plate of the cylindrical body, configured to allow the flammable liquid to enter the fluid chamber,
- wherein the air chamber and the fluid chamber are separated,
- wherein the one or more fine mesh screens in the fluid chamber have apertures, wherein the one or more fine mesh screens in the air chamber have apertures smaller than the apertures in the one or more fine mesh screens in the fluid chamber.

16. The flame mitigation device of claim 15, wherein the one or more fine mesh screens in the fluid chamber include apertures sized to regulate the flow of the flammable liquid.

17. The flame mitigation device of claim 15, wherein the air outlet is connected to an air outlet pipe with a diameter selected to produce small bubbles to avoid glugging.

18. The flame mitigation device of claim 17, further comprising a silicone tube fitted on the air outlet pipe, the silicone tube having a length sufficient to reach proximate to a bottom of the container.

19. The flame mitigation device of claim 15, wherein the one or more fine mesh screens in the fluid chamber have a horizontal orientation and the one or more fine mesh screens in the air chamber have a vertical orientation.

20. The flame mitigation device of claim 15, wherein the one or more fine mesh screens in the fluid chamber are separated by exchangeable spacers having a height.

21. The flame mitigation device of claim 15, wherein the one or more air inlets are extruded above a level of the fluid outlet.

22. An assembly for dispensing flammable liquid, comprising:

- a container storing flammable liquid;
- a flame mitigation device attached to the container, the flame mitigation device comprising:
- a cylindrical body having a top plate and a bottom plate;
- a fluid chamber within the cylindrical body, the fluid chamber including one or more fine mesh screens configured to regulate flow of the flammable liquid;
- an air chamber within the cylindrical body, the air chamber including one or more fine mesh screens configured to allow air to enter the container while preventing flame propagation;
- a fluid outlet located at the top plate of the cylindrical body, configured to dispense the flammable liquid from the fluid chamber;
- one or more air inlets located at the top plate of the cylindrical body, configured to allow air to enter the air chamber;
- an air outlet located at the bottom plate of the cylindrical body, configured to release air from the air chamber into the container; and
- a fluid inlet located at the bottom plate of the cylindrical body, configured to allow the flammable liquid to enter the fluid chamber,
- wherein the air chamber and the fluid chamber are separated,
- wherein the one or more air inlets are extruded above a level of the fluid outlet to allow the flammable liquid to flow around the one or more air inlets when pouring to prevent the flammable liquid from entering the one or more air inlets whilst pouring.

23. The assembly of claim 22, wherein the container is a metal canister.

24. The assembly of claim 22, wherein the one or more fine mesh screens in the fluid chamber have a horizontal orientation and the one or more fine mesh screens in the air chamber have a vertical orientation.

25. The assembly of claim 22, wherein the one or more fine mesh screens in the fluid chamber are separated by exchangeable spacers having a height.

26. The assembly of claim 22, wherein the one or more fine mesh screens in the fluid chamber include apertures sized to regulate the flow of the flammable liquid.

27. The assembly of claim 22, wherein the one or more fine mesh screens in the fluid chamber have apertures, wherein the one or more fine mesh screens in the air chamber have apertures smaller than the apertures in the one or more fine mesh screens in the fluid chamber.

28. The assembly of claim 22, wherein the air outlet is connected to an air outlet pipe with a diameter selected to produce small bubbles to avoid glugging.

29. The assembly of claim 28, further comprising a tube fitted on the air outlet pipe, the tube having a length sufficient to reach proximate to a bottom of the container.

* * * * *